Dec. 27, 1938.                    A. LOGES                    2,141,796
TRANSMISSION BAND
Filed March 19, 1937
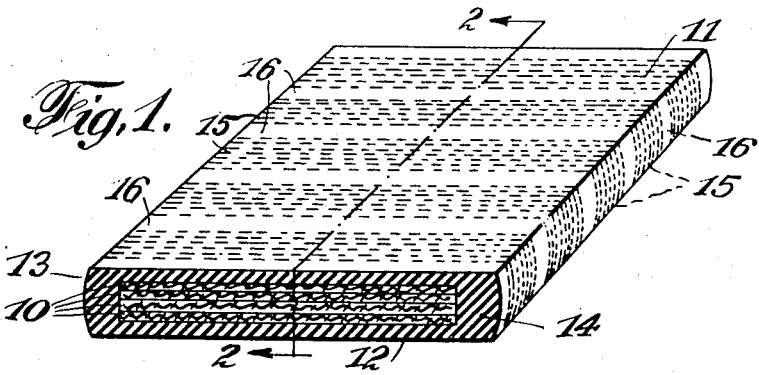
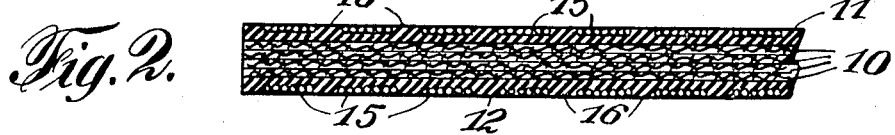
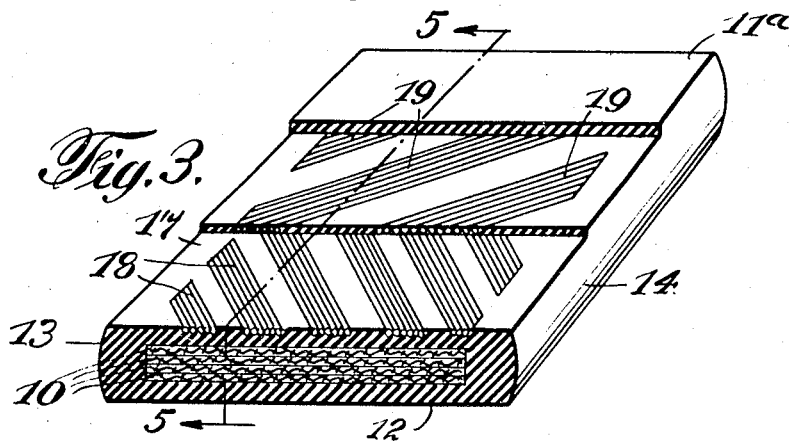
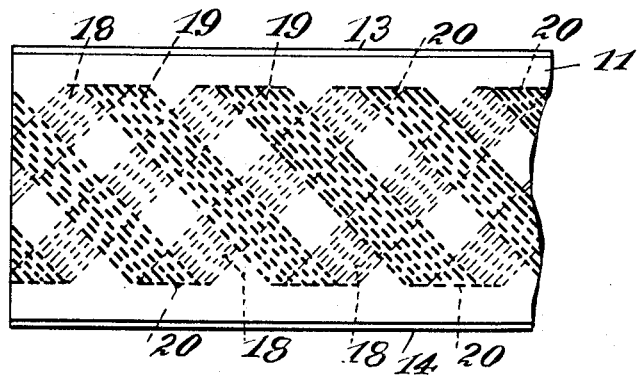
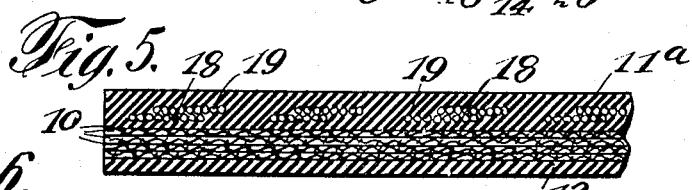
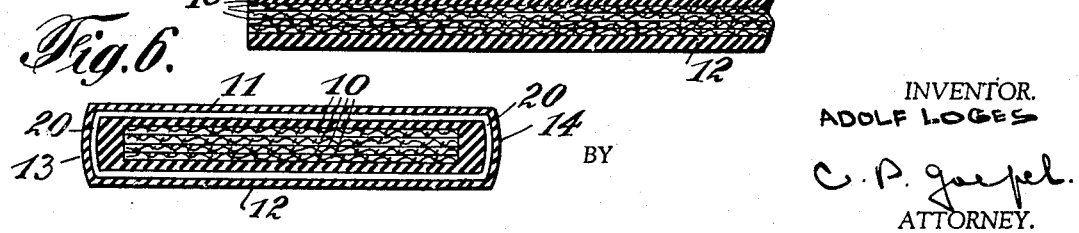
INVENTOR.
ADOLF LOGES
BY C. P. Goepel.
ATTORNEY.

Patented Dec. 27, 1938

2,141,796

UNITED STATES PATENT OFFICE 2,141,796

TRANSMISSION BAND

Adolf Loges, Hanover, Germany, assignor to Continental Gummi-Werke A. G., Hanover, Germany, a corporation of Germany Application March 19, 1937, Serial No. 131,904
In Germany March 18, 1936

4 Claims. (Cl. 74—232)

This invention relates to transmission bands, and it has for its particular object to provide means to strengthen such bands and to provide means to enable such bands to resist any injury to which such transmission bands are subjected due to heavy articles or the like falling upon the same or engaging the same and subjecting them to destruction.

Rubber covered transmission bands have the advantage of flexibility and resiliency, but have the disadvantage that the light covering of rubber may be easily destroyed by heavy articles falling thereupon or by sharp pointed objects engaging the transmission band and tearing the rubber covering which offers little resistance to such tearing action.

This invention consists in providing transmission bands with textile coverings of various forms, either transversely along the longtudinal length of the transmission band or diagonally to the length of the bands, whereby a resisting member is provided which prevents a longer tear of the transmission band or belt. By the provision of such resisting textile members any engagement of the band by a sharp hook or the like would be resisted by such transverse textile strengthening members. At the same time, any heavy articles falling upon the band or belt would tear only a part of the ribbon-like textile members and would not subject the remaining part of the band or belt to injury.

The invention will be further described, embodiments thereof shown, and the invention will be finally pointed out in the claims.

In the accompanying drawing, in which similar characters of reference indicate corresponding parts throughout the various views;

Fig. 1 is a perspective view of part of a transmission band or belt, in which the corded material is arranged transversely of the belt.

Fig. 2 is a transverse section taken on line 2—2 of Fig. 1,

Fig. 3 shows another embodiment of my invention in perspective and in partial section, Fig. 4 is a plan view of Fig. 3, Fig. 5 is a section taken on line 5—5 of Fig. 3, and Fig. 6 is a transverse section of another embodiment of my invention in which the corded material extends all around the belt or band close to the surface thereof, being embedded in the top and bottom layers and in the side edges thereof, the corded material being arranged spirally along the longitudinal length of the band or belt, and around the band or belt.

Referring to the drawing and more particularly to Figs. 1 and 2, the transmission band or belt is constructed in the well-known manner by having a series of plys of textile material forming the core of the band, which core is surrounded by rubber forming the top and bottom layers and surrounded by the side portions forming the corner or edges. Constructions as just described are old and well-known and form no part of this invention excepting in combination with the improvements about to be described.

The core, consisting of a plurality of layers of textile material, is indicated by 10, the top layer of rubber by 11, the bottom layer of rubber by 12, the side covering of rubber by 13, and the other side covering of rubber by 14. Before the band or belt is completed in its manufacture as just described, there are arranged on the exterior of such a structure parallel and spaced bands of textile material made of cords, which cords are arranged as shown in Fig. 1 transverse to the length of the belt. Each of these bands of corded textile material, indicated in Fig. 1 by 15, is made in the form of a loop which surrounds the transmission band or belt and is embedded in the layers and side parts 11, 12, 13 and 14, being also covered by exterior layers of rubber so that insofar as the outside appearance of the transmission belt or band is concerned it appears as if it were rubber throughout, and in consequence provides a smooth surface throughout.

These bands of textile material indicated by 15 are spaced from each other as shown by the spaces 16 which may be of any width, small or large, depending upon the use to which the transmission band or belt is to be put, and the cords themselves of each of these separate bands 15 may be either thin or thick, or close together or somewhat spaced, again depending upon the use to which the final transmission belt or band is to be put.

Should any hook engage the outer surface of this transmission band or belt, it would be held by these transverse cords, and if one or more of the cords should be torn, the additional cords would offer a further resistance to the tearing action of such a hook and the injury to the belt would be correspondingly localized, and similarly if any bulky matter should fall upon the belt and thus tear it, the injury would again be localized, first on account of the resistance which these embedded cords would provide, and secondly because these embedded cords would avoid a lengthwise or transverse tearing of the rubber top layer.

Instead of making these corded bands transverse to the length of the transmission band or belt and spacing them as shown in Figs. 1 and 2, these corded bands or ribbons may be arranged diagonally to each other in any crossing fashion as shown in Figs. 3, 4 and 5. In the embodiment there shown, the lower surface of the belt 17 is provided with these ribbons 18 arranged at one angle to the length of the belt, and superimposed upon this plurality of ribbons 18 another plurality of ribbons 19 is arranged, which ribbons 19 are at another angle to the angular arangement of the ribbons 18.

In the embodiment, the ribbons 18 are embedded in a rubber layer as shown, and the ribbons 19 are embedded in an adjacent layer as shown, and thereupon the top layer 11a of the transmission belt covers these two layers of cross ribbons.

The ribbons shown in Fig. 3 may be either brought about by separate pieces of suitable length having their ends cut at a bias, or as an alternative form, ribbons can be used which bend upon themselves as indicated by the bent portion 20 in Fig. 4. Thus there are shown in Fig. 4 a series of adjacent ribbons longer than the length of the belt, each bent at the lateral portions of the belt 17, as shown by the reference character 20, and these ribbons continue along the length of the belt in their different angular positions.

Instead of providing separate layers as shown in Fig. 3, these cord ribbons can also be arranged entirely around the belt so that they protect also the lower wall 12 and the side walls 13 and 14, and such an embodiment has one ribbon going along the length of the belt in, so to say, spiral or helical fashion. By around the belt is understood, of course, that these corded ribbons are not exposed but are embedded in the rubber material forming the transmission belt or band. In Figure 6 is shown a transverse section of a band or belt, in which one corded rubber goes around the band in helical fashion, yet is embedded therein.

The top and bottom outer rubber walls are shown by 11 and 12, the side rubber walls by 13 and 14, the case by 10, and the corded ribbon by 20, which goes all around the band.

Various other embodiments may be carried out in accordance with my invention, and in each of the cases described it will be seen that the embedded or anchored corded material so arranged as spaced apart, provided certain edges as hereinbefore described, and the spacing apart of the corded ribbons or corded material retains the initial resiliency of the rubber belt or band coating, since the spaces therebetween serve to retain the inherent resiliency of a rubber coated belt or band.

I have described various embodiments of my invention, but changes may be made therein without departing from the spirit of the same, as defined in the appended claims.

What is claimed is:

1. A rubber transmission band or belt comprising a core, a rubber coating around the same, and spaced apart corded strands, each separate from the other and arranged in groups spaced longitudinally apart from each other, along the length of the belt or band embedded in the rubber adjacent the surface of the belt or band, the rubber filling the spaces between the separate strands and groups of strands, the groups of strands and rubber filled spaces therebetween being in a plane longitudinally of the belt, and the rubber filled spaces between the groups of strands having a width at least half the width of each group of strands.

2. A rubber transmission band or belt comprising a core, a rubber coating around the same, and spaced apart corded strands, each separate from the other and arranged in groups spaced longitudinally apart from each other, along the length of the belt or band embedded in the rubber adjacent the surface of the belt or band, said corded strands being arranged transversely of the length of the belt or band, and at right angles to the longitudinal axis of the band or belt, the rubber filling the spaces between the separate strands and groups of strands, the groups of strands and rubber filled spaces therebetween being in a plane longitudinally of the belt, and the rubber filled spaces between the groups of strands having a width at least half the width of each group of strands.

3. A rubber transmission band or belt comprising a core, a rubber coating around the same, and spaced apart corded strands, each separate from the other and arranged in groups spaced longitudinally apart from each other, along the length of the belt or band embedded in the rubber adjacent the surface of the belt or band, said groups of said corded strands being arranged so as to be at an inclination to the longitudinal axis of the band or belt with the groups crossing each other but spaced vertically apart from each other throughout the length of the belt or band, the rubber filling the spaces between the strands and between the groups of strands, both when longitudinally and vertically spaced from each other, the groups of strands and rubber filled spaces therebetween being in a plane longitudinally of the belt, and the rubber filled spaces between the groups of strands having a width at least half the width of each group of strands.

4. A rubber transmission band or belt comprising a core, a rubber coating around the same, and spaced apart corded strands, each separate from the other and arranged in groups spaced longitudinally apart from each other, along the length of the belt or band embedded in the rubber adjacent the surface of the belt or band, said strands extending all around the belt so as to be embedded in the top and bottom layers and the side edges thereof, the rubber filling the spaces between the separate strands and groups of strands, the groups of strands and rubber filled spaces therebetween being in a plane longitudinally of the belt, and the rubber filled spaces between the groups of strands having a width at least half the width of each group of strands.

ADOLF LOGES.